United States Patent Office 2,807,757
Patented Sept. 24, 1957

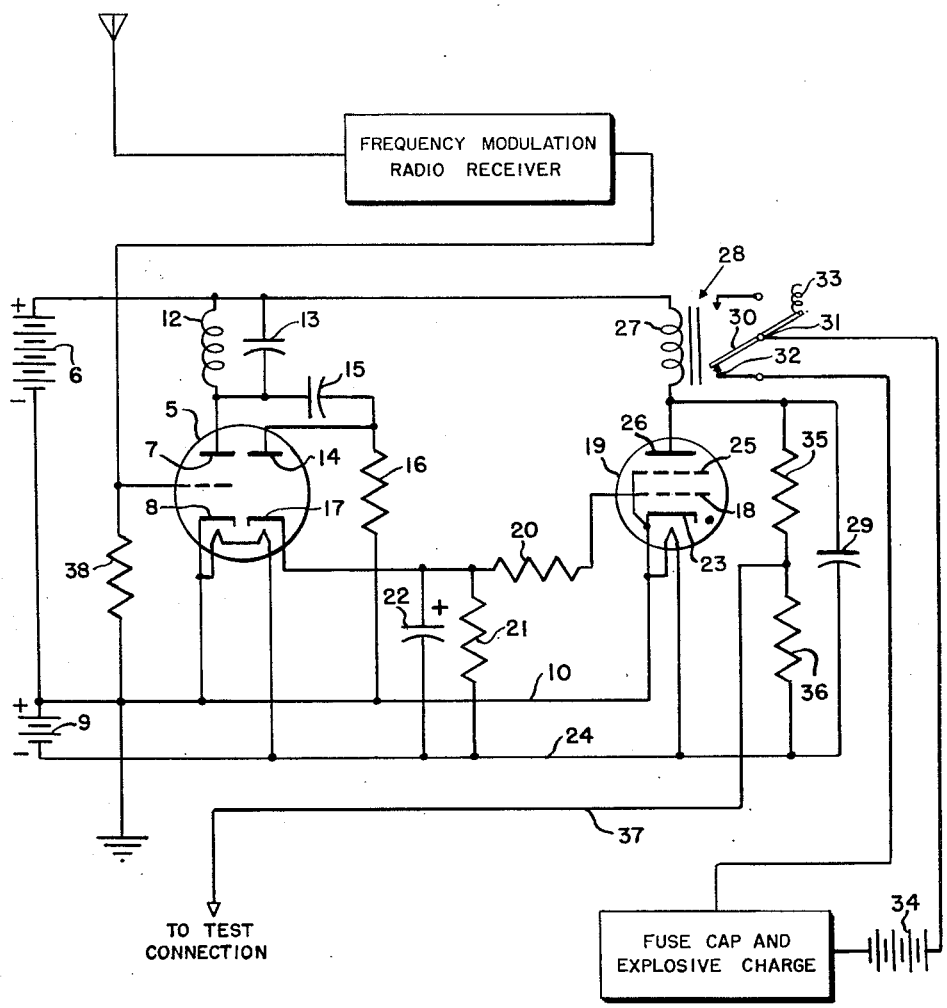

2,807,757

ELECTRONIC RELAY CONTROL

Robert W. Callinan, Rumson, N. J., assignor to the United States of America as represented by the Secretary of the Army Application February 2, 1953, Serial No. 334,767

7 Claims. (Cl. 317—146)

(Granted under Title 35, U. S. Code (1952), sec. 266)

The invention described herein may be manufactured and used by or for the Government for governmental purposes without the payment of any royalty thereon.

This invention relates to an automatic apparatus for controlling the flow of relatively high volume power in an electric circuit by means of extremely low power input signals and is particularly adapted to remotely controlling inaccessible vehicles while in motion.

The present invention fulfills many exacting requirements in the accurate and reliable control of a wide variety of devices and is found highly efficient in the control of objects in free flight wherein compactness and light weight are essential characteristics.

Desirably, the invention is used in connection with a radio set in which a transmitted pulse or signal is received and amplified thereby. The output of the radio set is fed to an amplifier tube the output of which is rectified by a diode tube. The tube circuit is so designed that its rectified output will produce the positive voltage which is fed to the control grid of a thyratron tube. The thyratron is properly supplied with power and its circuit so designed that it will oscillate while its grid is maintained sufficiently positive. During its operation a relatively high volume of current flows in its plate circuit and this current is used to power a utilization device of any kind such as a relay.

The device of the invention is so designed that when the signal which is being transmitted thereto is interrupted the thyratron cuts off. An added feature, however, functions to maintain operation of the thyratron automatically for a short period of time after the signal is interrupted. The purpose of this latter feature will be set forth hereinafter.

An important feature of the device lies in its ability to function efficiently with a minimum of tubes and circuit elements from direct current power sources such as light weight batteries. These power sources may be contained in the vehicle to be controlled.

It is a primary object of the invention to provide light weight and powerful electronic control devices.

A further object of the device is to provide a control apparatus which is completely consistent and reliable in operation.

A further object of the invention is to provide a powerful and reliable remote control device in which the only link between an established control station and the object to be controlled is the power radiated from the control station.

A further object of the invention is to provide a control apparatus in which an automatic safety device is activated upon the failure in function of any of the elements comprising the apparatus.

Still another object of the invention is to provide an apparatus which will automatically sustain control over the object or vehicle despite momentary interruptions or diminution of the control signal.

A still further object of the invention is to provide an electronic control which will respond only to a signal of predetermined frequency.

Other objects and features of the invention will more fully appear from the following description and will be particularly pointed out in the claims.

To more effectively present the invention a particular embodiment thereof will be described in connection with the accompanying drawings in which the figure illustrates the apparatus diagrammatically.

One of the most effective applications of the invention is its use for the control of rockets in flight and it is this application of the invention which will be described as a typical example of the many uses to which the invention may be put. In the design and testing of rockets it is necessary that positive control over the rocket motor at all times be maintained during its flight. An important reason for this is that an operator should have the power to ground the rocket at any time as for instance if its main directional control mechanism should fail to function properly and the rocket should digress from its intended course. If the rocket digresses it is imperative that it be brought down to prevent its landing in an unchartered area.

It has been found that an effective means for grounding the rocket is to rupture the fuel line to its motor and the invention provides the chief instrumentalities for accomplishing this result in an emergency or for other reasons during the flight of the rocket. To maintain this control, radio communication is established between the ground control station and the rocket. The establishment of this controlling link is provided by radio sensitive apparatus housed within the rocket. Signals from a ground transmitter are received by a radio set which may be of conventional type and desirably is a frequency modulation receiver as indicated in block diagram in the drawing. This receiver is designed to function in conjunction with the ground transmitter to supply an amplified alternating current output signal of sine wave form.

The output of the radio receiver is fed to the control grid of the triode portion of a dual purpose tube 5 which contains a triode and a diode. The tube is powered by a battery 6 the positive terminal of which is connected to the plate 7 of the triode. The cathode 8 of the triode is connected to the negative terminal of the plate battery 6. The plate 7 is desirably tuned to respond to a predetermined frequency by the coil 12 and condenser 13.

The triode portion of the tube 5 preferably has a relatively high gain of the order of 70 or more. This output is fed to the plate 14 of the diode section of the tube through a condenser 15. The plate 14 is also connected to the wire 10 thru a high resistance 16. The wire 10 is connected to the negative terminal of the plate battery 6. The dual purpose tube 5 is used to promote compactness and light weight but separate triode and diode tubes may be used if desired.

The cathode 17 of the tube 5 is connected to the control grid 18 of a thyratron tube 19 thru a high value resistor 20. Again in the interest of compactness and light weight the thyratron desirably is of the miniature type as are all of the tubes used in the apparatus. The cathode 17 is also connected to a resistor 21 and to the plate of a condenser 22. The other terminal of the resistor 21 and the condenser 22 are connected to the wire 24. The last two elements function in a manner to be described hereinafter.

The cathode 23 of the thyratron and one terminal of its heater are connected to the wire 10 while the other cathode heater terminal is connected to the wire 24 to which the negative side of the combination heater and bias battery 9 is connected. The second grid element 25 of the thyratron is connected to its cathode. The plate 26 of the thyratron is connected to the positive high voltage plate battery terminal thru the winding 27 of a relay 28. The plate 26 is also connected to one terminal of a condenser 29 the other terminal of which is connected to the wire 24. Coil 27 and condenser 29 control the relaxation frequency of the oscillator.

The relay 28 is provided with armature 30 which closes a pair of contacts 31 and 32 under the influence of a spring 33 when the winding 27 is deenergized. The contacts 31 and 32 may be connected in the circuit of any desired load. As shown the contacts serve to close the circuit including a battery 34 and an explosive device indicated in block diagram on the drawing and which is used to rupture the fuel line of a motor or other device such as the rocket motor above referred to.

In the practice of the specific application of the invention described herein the radio set and the control device are housed within the rocket and a small antenna is arranged upon the rocket and connected to the input of the radio set. At the start of a rocket flight the ground transmitter must be set into operation when the rocket motor is started and continue to transmit thru the flight of the rocket unless it is desired to ground the rocket in an emergency or for some other reason. The signal from the transmitter is picked up by the antenna, amplified by the radio receiver and fed to the grid of the triode portion of the tube 5. This grid is connected to the wire 10 thru a conventional grid resistor 38. The signal desirably is of sinusoidal alternating current form. However, the signal may be in the form of a series of pulses having a specific form dictated by a specific requirement.

The triode portion of the tube 5 amplifies and feeds the signal to the diode portion of the tube where it is rectified and fed as direct current to the grid 18 of the thyratron at which point a positive voltage is thereby established. This positive grid bias causes the tube to oscillate as a relaxation oscillator at a frequency determined by the value of the condenser 29. In this manner a substantial current is caused to flow in the plate circuit of the thyratron thus energizing the relay which opens the load circuit and holds it open while the ground transmitter is in operation.

In the specific application of the invention herein set forth and in many other applications it is desirable to automatically maintain the load circuit in operating condition for a measured period of time after the control signal has been cut off. In some applications this would mean that the load circuit might be held closed but in the present application the load circuit is held open for a short period of time such as a period of a second or two seconds by a delaying means.

The delaying means functions as follows. It will be noted that during normal operation of the circuit the condenser 22 being connected to the diode rectifier becomes charged with a positive voltage the polarity of the condenser charge being established as indicated in the drawing. When the controlling input signal is discontinued its charging voltage ceases and the condenser 22 starts to discharge thru the resistor 21 and in so doing positive voltage is generated across the resistor which is conducted to the grid 18 of the thyratron thus acting to continue the flow of current in its plate circuit. As the condenser becomes discharged a point is reached where the negative bias supplied by the battery 9 takes over and the action of the tube is cut off. The spring 30 on the relay then closes the circuit to the load and the rocket's motor fuel line is ruptured by the explosive charge thus grounding the rocket.

During the operation of the thyratron tube when its gas content is ionized its internal resistance is momentarily very low. At this time the resistor 20 functions to limit the grid current and prevent malfunction of the time delay network consisting of the condenser 22 and the resistor 21.

The slight delay set up by the device above described functions to prevent grounding of the rocket when the transmitter may be only momentarily interrupted or when for some other reason the signal strength received by the radio within the rocket drops to a point where the load circuit may become energized. This drop in signal strength may arise from a change in position of the rocket in its flight due possibly to its tendency to rotate at which time a slight directional characteristic of its antenna may cause a lowering of signal strength picked up thereby. Since this is only a momentary condition it would not be desirable to cause the apparatus to ground the rocket when such action is not required.

It should be noted that the above described apparatus is so designed that if its power supply is cut off at any point in the circuit or if a circuit element fails to function properly the thyratron will cease to conduct and the load circuit will close. Thus it will be seen that when control from the ground is lost the rocket will be grounded and that such action guards against the possibility that complete control of its flight may be lost by failure of its other controlling elements. Moreover, inasmuch as the circuit of plate 7 is tuned to a selected frequency the whole apparatus will respond only to that frequency to which the plate is tuned which must also be the frequency of the controlling ground transmitter. Thus, frequencies differing from the one in use fail to interfere with the desired control effected by the invention.

Since the reliability of operation of the device is highly important it is desirable to provide means for checking its operation before a flight or at least at regular intervals. A convenient means for accomplishing this result is to provide a resistance coupled auxiliary circuit connected at one end to the plate 26 of the thyratron and comprising a pair of resistors 35 and 36 connected in series and connected to the wire 24. A wire 37 is connected between the two resistors leading to a convenient point for temporary connection to an indicating instrument such as an oscilloscope.

What is claimed is:

1. An electronic control system comprising a thyratron tube relaxation oscillator circuit, said tube comprising an anode, a grid, a cathode, and a heater therefor, a source of direct current for energizing said heater, said cathode being connected to the positive terminal of said source, said grid being connected in series with a high impedance to the negative terminal of said source, the potential of said source being sufficient to maintain said tube nonconducting, whereby said oscillator circuit is normally prevented from oscillating, and a circuit for applying a control voltage between said grid and cathode in a direction to render said tube conducting and cause said oscillator circuit to oscillate.

2. A control system as set forth in claim 1, wherein said last named circuit comprises a resistance and condenser across which said control voltage is applied in parallel, whereby upon removal of said control voltage said tube is maintained conducting for a period determined by the time constant of said resistance and condenser.

3. A control system as set forth in claim 1, wherein said oscillator circuit comprises a source of direct-current potential connected to said anode in series with an impedance, and a charging condenser connected between the anode and cathode of said tube.

4. A control system as set forth in claim 3, wherein said impedance comprises a coil, and a utilization circuit responsive to changes in the current in said coil due to changes in the oscillating condition of said oscillator circuit.

5. A control system as set forth in claim 4, wherein said coil is part of an electromagnetic relay having a movable circuit control means connected in said utilization circuit.

6. A remotely-controlled, relay system adapted to respond to signal-modulated radio carrier waves comprising a receiver for receiving said waves and detecting the modulation component thereof, rectifier means excited by said modulation component for converting said modulation component to a direct-current potential, the output circuit of said rectifier means upon which said direct-current potential is derived comprising a resistor and capacitor in parallel, whereby upon cessation of reception of said carrier waves said direct-current potential is maintained for a time determined by the time constant of said resistor and condenser, a relaxation oscillator circuit comprising a thyratron tube having at least an anode, a control grid, an indirectly heated cathode, and a cathode heater, an electromagnetic relay comprising a coil and a movable armature actuated thereby, a battery having its positive terminal connected to said anode in series with said coil, and its negative terminal connected to said cathode, a cathode heating battery connected across said heater and having its positive terminal connected to said cathode and its negative terminal connected to said grid in series with said resistor and an additional current limiting resistance, the potential of said cathode heating battery maintaining said tube non-conducting, a condenser connected between the anode and cathode of said tube, said tube, said coil, and the last mentioned condenser forming a relaxation oscillator circuit, whereby when a direct-current potential appears across said output circuit of said rectifier means, said tube is rendered conducting and said oscillator circuit begins oscillating and the resultant current in said coil actuates said armature, and a circuit controlled by said armature.

7. A relay system as set forth in claim 6, including means to tune said rectifier circuit to the frequency of said modulation component.

References Cited in the file of this patent

UNITED STATES PATENTS

| | | |
|---|---|---|
| 2,094,351 | Draper et al. | Sept. 28, 1937 |
| 2,247,246 | Lindsay | June 24, 1941 |
| 2,356,364 | Tice | Aug. 22, 1944 |
| 2,403,615 | Sanders | July 9, 1946 |
| 2,479,548 | Young | Aug. 16, 1949 |
| 2,496,975 | Bach | Feb. 7, 1950 |
| 2,531,416 | Ferrar | Nov. 28, 1950 |
| 2,536,527 | Appel | Jan. 2, 1951 |
| 2,655,595 | Chambers | Oct. 13, 1953 |